(12) United States Patent
Sarafa et al.

(10) Patent No.: US 10,917,374 B2
(45) Date of Patent: Feb. 9, 2021

(54) TECHNIQUES TO VISUALIZE MESSAGING FLOW

(71) Applicant: WhatsApp Inc., Mountain View, CA (US)

(72) Inventors: Randall Sarafa, San Francisco, CA (US); Kuan Loong Yong, Los Altos, CA (US); Michael B. Donohue, Mountain View, CA (US); Dmitri Stukalov, Palo Alto, CA (US)

(73) Assignee: WHATSAPP INC., Menlo Park, CA (US)

( * ) Notice: Subject to any disclaimer, the term of this patent is extended or adjusted under 35 U.S.C. 154(b) by 148 days.

(21) Appl. No.: 15/371,152

(22) Filed: Dec. 6, 2016

(65) Prior Publication Data
US 2018/0159812 A1   Jun. 7, 2018

(51) Int. Cl.
*H04L 12/58* (2006.01)
(52) U.S. Cl.
CPC .............. *H04L 51/16* (2013.01); *H04L 51/04* (2013.01); *H04L 51/066* (2013.01)
(58) Field of Classification Search
CPC ......... H04L 51/04; H04L 51/16; H04L 51/00; H04L 51/34; H04L 51/36; H04L 51/066
See application file for complete search history.

(56) References Cited

U.S. PATENT DOCUMENTS

| 7,936,780 | B1 * | 5/2011 | Kompella | H04L 45/507 370/254 |
| 9,426,102 | B1 * | 8/2016 | Wong | H04L 51/16 |
| 2008/0055269 | A1 * | 3/2008 | Lemay | G06F 3/017 345/173 |
| 2011/0191433 | A1 * | 8/2011 | Du | G06F 15/16 709/206 |
| 2013/0218896 | A1 * | 8/2013 | Palay | H04L 51/16 707/741 |
| 2013/0332850 | A1 * | 12/2013 | Bovet | H04L 51/22 715/752 |
| 2014/0229551 | A1 * | 8/2014 | Carter | H04L 51/32 709/206 |
| 2015/0007050 | A1 * | 1/2015 | Jakobson | H04L 51/16 715/752 |

(Continued)

*Primary Examiner* — Patrice L Winder
*Assistant Examiner* — Aye M Aung
(74) *Attorney, Agent, or Firm* — Kacvinsky Daisak Bluni PLLC

(57) ABSTRACT

Techniques to visualize messaging flow are described. In one embodiment, an apparatus may comprise a messaging component operative to receive a message package at a client device, the message package comprising a primary message portion and a quoted message portion, the quoted message portion comprising a quoted message identifier; determine whether a quoted message store corresponding to the quoted message identifier is present on the client device; retrieve a primary message from the primary message portion; retrieve a quoted message based on the quoted message store where the quoted message store corresponding to the quoted message identifier is present on the client device; and retrieve the quoted message from the quoted message portion of the message package where the quoted message store corresponding to the quoted message identifier is not present on the client device. Other embodiments are described and claimed.

16 Claims, 12 Drawing Sheets

(56) References Cited

U.S. PATENT DOCUMENTS

2015/0264303 A1* 9/2015 Chastney .............. H04N 7/147
  709/206
2017/0111299 A1* 4/2017 Arisada ................ H04L 51/046

* cited by examiner

700

Receive a message package at a client device, the message package comprising a primary message portion and a quoted message portion, the quoted message portion comprising a quoted message identifier.
702

Determine whether a quoted message store corresponding to the quoted message identifier is present on the client device.
704

Retrieve a primary message from the primary message portion.
706

Retrieve a quoted message based on the quoted message store where the quoted message store corresponding to the quoted message identifier is present on the client device.
708

Retrieve the quoted message from the quoted message portion of the message package where the quoted message store corresponding to the quoted message identifier is not present on the client device.
710

Display the primary message in association with the quoted message on the client device.
712

*FIG. 7*

TECHNIQUES TO VISUALIZE MESSAGING FLOW

BACKGROUND

Mobile devices may run applications, commonly known as "apps," on behalf of their users. These applications may execute as processes on a device. These applications may engage in network activity on the mobile device, such as may use wireless signals, including Wi-Fi, cellular data, and/or other technologies.

Cellular carriers may provide cellular data communication to their cellular customers. For example, smart phones and other mobile devices may run web browsers that may be used while on the cellular network to retrieve web pages. Additionally, many applications that may be pre-installed or user-installed on a mobile device may use cellular data communication to access remote data, such as resources available on the Internet.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to visualize messaging flow. Some embodiments are particularly directed to techniques to visualize messaging flow for a secure messaging system using embedded quoting. In one embodiment, for example, an apparatus may comprise a messaging component operative to receive a message package at a client device, the message package comprising a primary message portion and a quoted message portion, the quoted message portion comprising a quoted message identifier; determine whether a quoted message store corresponding to the quoted message identifier is present on the client device; retrieve a primary message from the primary message portion; retrieve a quoted message based on the quoted message store where the quoted message store corresponding to the quoted message identifier is present on the client device; and retrieve the quoted message from the quoted message portion of the message package where the quoted message store corresponding to the quoted message identifier is not present on the client device; and a user interface component operative to display the primary message in association with the quoted message on the client device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7 illustrates an embodiment of a logic flow for the system of FIG. 1.

DETAILED DESCRIPTION

Figure 1:
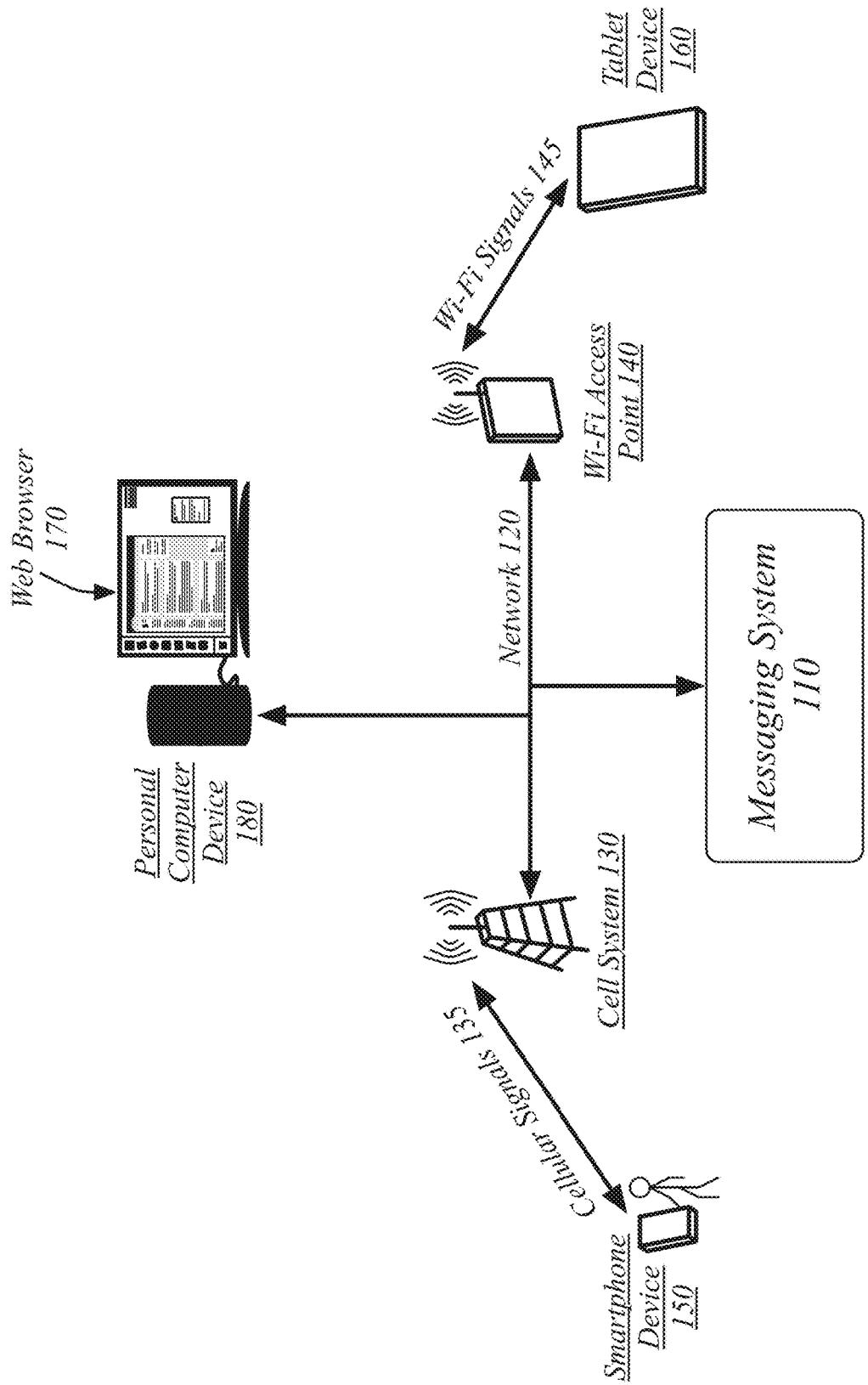
FIG. 1 illustrates an embodiment of a messaging flow visualization system.

Participants in a message thread exchange messages within the context of the thread. Some of the time, participants in the conversation may assume a shared context for statements that they make. They can assume that every other participant in the thread will understand how their contribution to their thread, how a particular message that they submit to the message thread, relates to previous messages in the thread. For instance, that a particular message they send serves as a response to a previous message in the message thread.

Unfortunately, in some cases, this context may not be apparent to at least some of the participants. As such, a participant may add context to their message by quoting another message to which they are replying. This quote appears as part of the participant's message and thereby communicates the context of the message. This context may be particularly useful where a user is a recent addition to a message thread. Specifically, where the user is a more recent addition than the message being replied to. For example, a user may join a group thread and be caught up in the middle of an ongoing conversation. The use of a replies may inform the user as to the context of the ongoing conversation. When a recipient client device has access to a message history for the message thread, the recipient client device may retrieve the quoted message based on a message identifier identifying the quoted message and use that retrieved copy of the quoted message to display the quote. Even where a participant is recent to the message thread and didn't originally receive the message being quoted, it may be provided or able to retrieve a message history for the message thread and thereby display the quote by retrieving the quoted message using its message identifier.

However, some messaging systems may be configured for device-to-device messaging communication, in which the messaging history of the messaging system is distributed across the client devices, without the servers of the messaging system storing messages in an accessible format. For instance, the servers may be used to temporarily store messages in transit—particularly where a client device is offline or otherwise unavailable—but not maintain a repository of messages that may be redistributed to provide a message history for a message thread.

In particular, the messaging system may use end-to-end encryption between client devices. The use of end-to-end encryption may entail outgoing messages from one client device being encrypted for one particular destination client device. As such, even if the messaging servers were to maintain a repository of messages, the messaging servers may not be able to decrypt the messages and therefore provide them in an unencrypted form to a client device other than the destination client device for which they were encrypted. Correspondingly, this other client device would also be unable to decrypt a stored message itself as the other client device would lack the encryption key or keys used to do so.

As such, the quoted message may be included with the quoting message sent by the sending client device. For instance, messages may be sent in message packages. The message package format may include a quoted message field, with this field available for the inclusion of another message. The sending client device retrieves the message from its own message history on the client device and includes it with the outgoing quoting message. As such, the quoted message is made available to recipient client devices that don't have access to the quoted message in their local message history and that are prevented from downloading the quoted message from a message repository on a messaging server, such as due to the use of device-to-device encryption.

Where a receiving client device for a quoting message has a local store of the quoted message it may incorporate that local store into its display of the quoted message. It may use the copy retrieved from the local store to retrieve the text, images, and/or other content of the message for display. It may also, where it has a local store of the quoted message, include a control in the display of the quoted message that, if selected, redirects the display of the message thread to the portion of the message thread history containing the quoted message. However, where it lacks a local store of the quoted message this control may be excluded or inactive, as the portion of the message thread history containing the quoted message is not available. As such, the messaging system may dynamically adjust in the display of quoted messages to whether or not the surrounding context for the quoted message is present on the device. The messaging system may therefore accommodate a lack of relevant messaging history on a client device while still providing additional context to users whose client device have the relevant messaging history, improving the user experience of quoted messages for its users.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging flow visualization system 100. In one embodiment, the messaging flow visualization system 100 may comprise a computer-implemented system having software applications comprising one or more components. Although the messaging flow visualization system 100 shown in FIG. 1 has a limited number of elements in a certain topology, it may be appreciated that the messaging flow visualization system 100 may include more or less elements in alternate topologies as desired for a given implementation.

The messaging system 110 may comprise one or more messaging servers operated by a messaging platform as part of the messaging flow visualization system 100. A messaging server may comprise an Internet-accessible server, with the network 120 connecting the various devices of the messaging flow visualization system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging system 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging system 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging system 110.

A messaging client may be a dedicated messaging client. A dedicated messaging client may be specifically associated with a messaging provider administering the messaging platform including the messaging system 110. A dedicated messaging client may be a general client operative to work with a plurality of different messaging providers including the messaging provider administering the messaging platform including the messaging system 110.

The messaging client may be a component of an application providing additional functionality. For example, a social networking service may provide a social networking application for use on a mobile device for accessing and using the social networking service. The social networking service may include messaging functionality such as may be provided by messaging system 110. It will be appreciated that messaging servers for the messaging system 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging system 110 due to it not maintaining or otherwise not having access to an existing state for the message inbox. The web browser 170 may then retrieve incremental updates for any new changes to the state of the message inbox so long as it maintains a user session with the messaging system 110, discarding its known state for the message inbox at the end of the session, such as when the web browser 170 is closed by the user. Without limitation, an update may correspond to the addition of a message to a mailbox, a deletion of a message from a mailbox, and a read receipt.

However, in other embodiments, the messaging client on a particular client device may be the source of truth for the messaging system 110, rather than messaging servers maintaining a store of the message inbox for a user. These embodiments may be preferred where the messaging system 110 employs an end-to-end encryption model of communication using end-to-end encryption techniques. Because of the use of end-to-end encryption techniques, the messaging servers of the messaging system 110 may temporarily store messages in transit between client devices, but be unable to decrypt the messages. As such, the messaging servers may be prevented from providing an inbox snapshot, or any other information relating to the messaging content of one or more message threads, to a client device. This may also have an effect in other situations. For example, where an additional user joins a group message thread, the messaging system 110 may be unable to provide the client device for the additional user with a history for the group message thread prior to the additional user joining the group message thread.

A messaging system 110 may operate by defining a messaging inbox as comprising a plurality of messages, wherein each message is an individual transaction of communication between two or more participants. A messaging server may operate by maintaining a message index for the messaging inbox. Messaging servers may receive messages and store the messages in message archives from which messages may be retrieved through reference to the message index. Messaging clients may connect to the messaging servers and retrieve messages that have been added to their message archive since their last update. The messaging clients may receive a message index from the message archive indicating what messages are stored in the message archive. The messaging clients may compare the message archive to their current inbox in order to determine what messages they are missing, which they then request from the message archive. The messaging clients may make changes to their inbox, which results in message inbox instructions being transmitted to the message archives instructing the message archives in modifications to make to the representation of their message inbox on the message archives.

Messaging interactions mediated by a messaging system 110 may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The messaging system 110 may use knowledge generated from interactions in between users. The messaging system 110 may comprise a component of a social-networking system and may use knowledge generated from the broader interactions of the social-networking system. As such, to protect the privacy of the users of the messaging system 110 and the larger social-networking system, messaging system 110 may include an authorization server (or other suitable component(s)) that allows users to opt in to or opt out of having their actions logged by the messaging system 110 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system 110 and other elements of a social-networking system through blocking, data hashing, anonymization, or other suitable techniques as appropriate.

Figure 2:
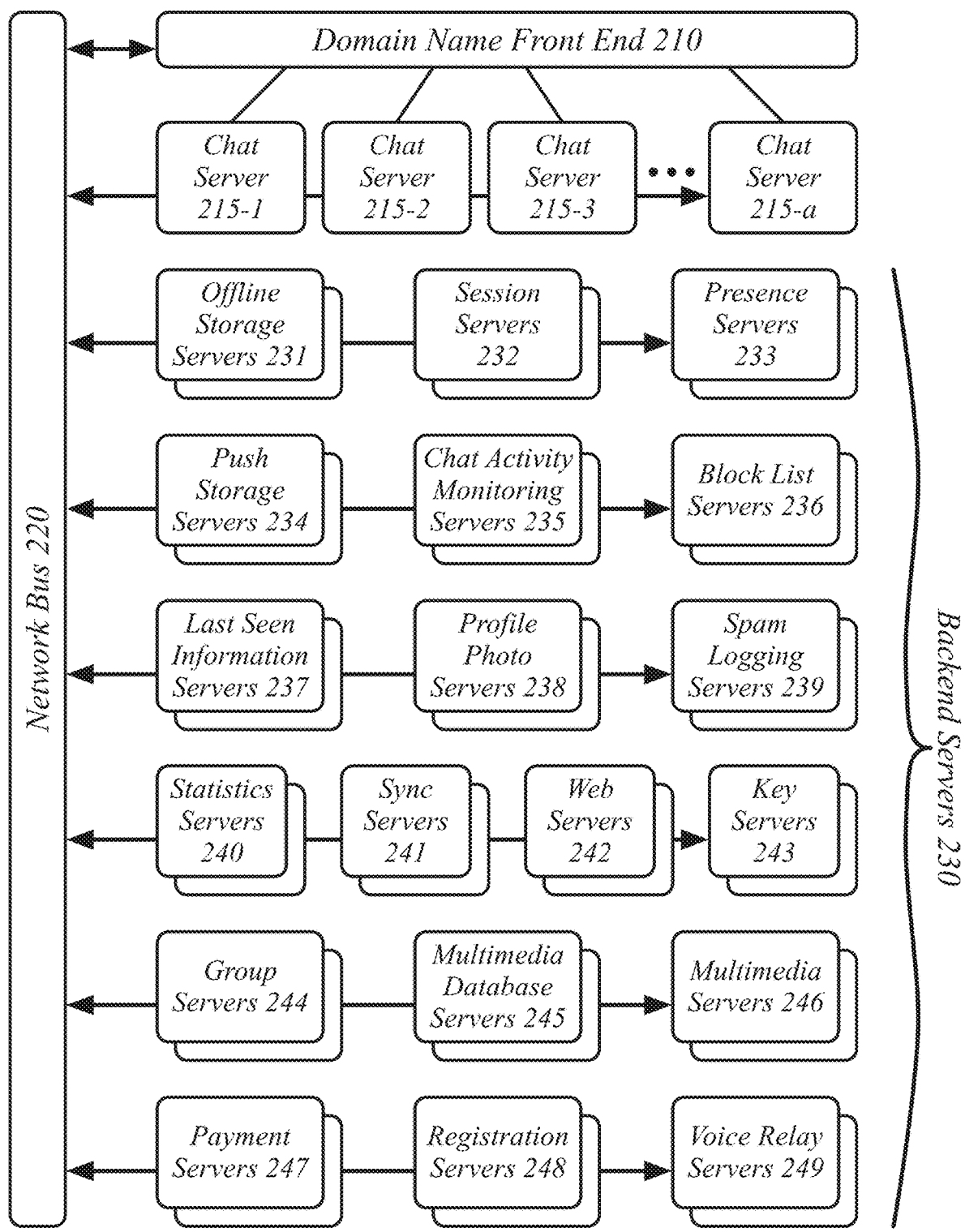
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the streaming audio system 100 with the operations of the streaming audio system 100 comprising a portion of the overall operations of the messaging system 200. The illustrated embodiment of the messaging system 200 may particularly correspond to a portion of the messaging system 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
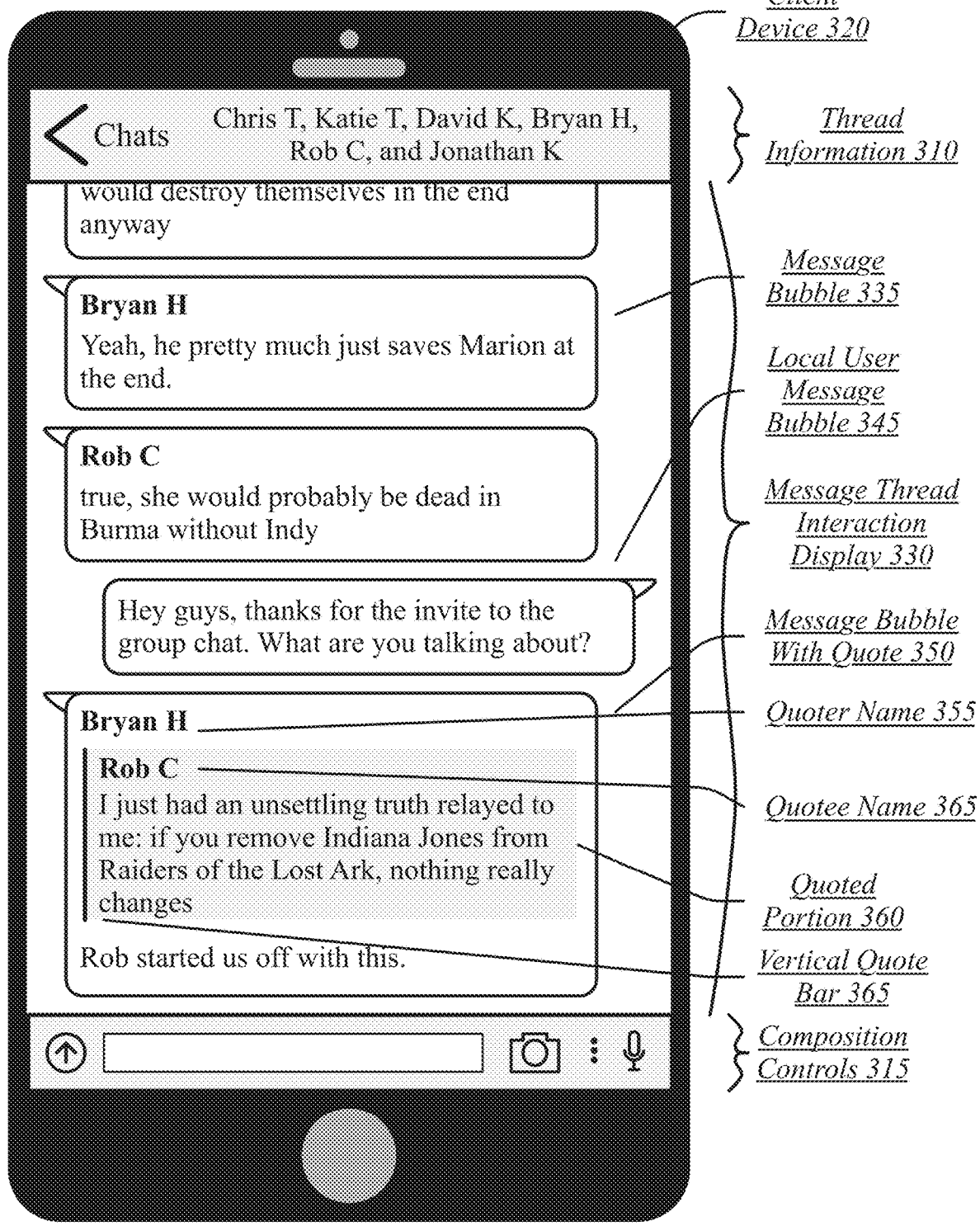
FIG. 3 illustrates an embodiment of a user interface including messaging flow visualization.

FIG. 3 illustrates an embodiment of a user interface including messaging flow visualization.

The user interface 300 may comprise a user interface for a message thread. At least a portion of the message exchange for the message thread may be displayed in a message thread interaction display 330. A message thread interaction display 330 may comprise a display of one or more messages exchanged by the users of the message thread. The features discussed with regards to a message thread may be applied to either one-on-one message threads or group message threads.

The user interface 300 may include a display of thread information 310. The thread information 310 may comprise a listing of one or more other users involved in the thread. A display of the one or more other users may use the name of a user, such as a full name, short name, or other name registered as the name for use with a particular user for messaging and/or social-networking interactions. A display of the one or more other users may use an avatar, profile picture, or other visual representation of the one or more other users.

The user interface 300 for a message thread may include composition controls 315 that are persistently visible during the display of a message thread. Many, most, or nearly all of the composition controls 340 may empower access to further user interface controls for the performance of various tasks, such as text entry, media selection, emoji selection, camera use, a social approval icon, etc.

Each of the one or more messages may be represented by a particular message bubble, such as message bubble 335. A message bubble may represent an atomic messaging interaction. A message bubble may generally correspond to a defined geometric area in which the contents of a particular messaging exchange (e.g., text, media) are contained within the defined geometric area. A message bubble may have a distinct color or plurality of colors (e.g., one or more gradients) that distinguish it from a background of a message thread interaction display. A message bubble may have a distinctly-colored border, such as a black outline as depicted, or may have a border defined by the interface between differing colors of the message bubble and the background. In some embodiments, the color or colors of either or both the message bubbles and the background may be customized and configured by users of the messaging system 110.

A message that quotes another message may be presented as a message bubble with quote 350. The quote appears as a quoted portion 360 displaying at least a portion of the previous message in the message thread. The message bubble with quote 350 includes the features of a non-quoting message bubble, such as message bubble 335. These features include a quoter name 355, the display name for the user quoting the quoted message, and may include additional message content provided by the quoting user. For example, the quoting user may reply to, comment on, or otherwise supplement the quoted portion 360. The quoted portion 360 may include a quotee name 365, the display name for the user being quoted.

To visually differentiate the contributions of different users, different colors may be used for different users in the message thread interaction display 330. Each user may be associated with a particular color. In some embodiments, the specific colors associated with specific users may be made consistent across multiple client devices by the messaging system 110. In other embodiments, the assignment of specific colors to specific users may be local to a client device 320. The names of participants in the message thread may each be displayed using the color assigned to each participant. The color assigned to the quotee may be used in the display of the quoted portion 360, such as by coloring the quotee name 365 in the quotee color. The quoted portion 360 may be indicated, at least in part, by a vertical quote bar 365 alongside the extent of the quoted portion 360. This vertical quote bar 365 may be positioned proximate to the quoted portion 360, such as along one edge of it. This vertical quote bar 365 may be displayed in the quotee color to visually communicate that the quoted portion 360 of the message bubble with quote 350 was originally provided by the quotee. The quoter name 355 is still displayed using the quoter color to indicate that the message as a whole—including the decision to include the quoted portion 360, though not the generation of the contents of the quoted portion 360—was provided by the quoter.

In some embodiments, at least some portion of the quoted portion 360 may comprise a control empowering redirection of the message thread interaction display 330 to the portion of the history of the message thread that corresponds to the original reception of the quoted message. For instance, the entirety of the quoted portion 360 may be a touch-screen control which, if selected, scrolls the message thread interaction display 330 upwards until the quoted message is visible on the client device 320. However, as the quoted message may not be presented on the client device 320 in some cases—such as where the message thread is a group thread in which the quoted message was sent prior to the user of the client device 320 joining the group thread—the redirection control may be inactive. As such, a redirection control for a quoted portion 360 may be selectively active based on whether or not the quoted message is present in the message history for a message thread on a client device 320.

Figure 4:
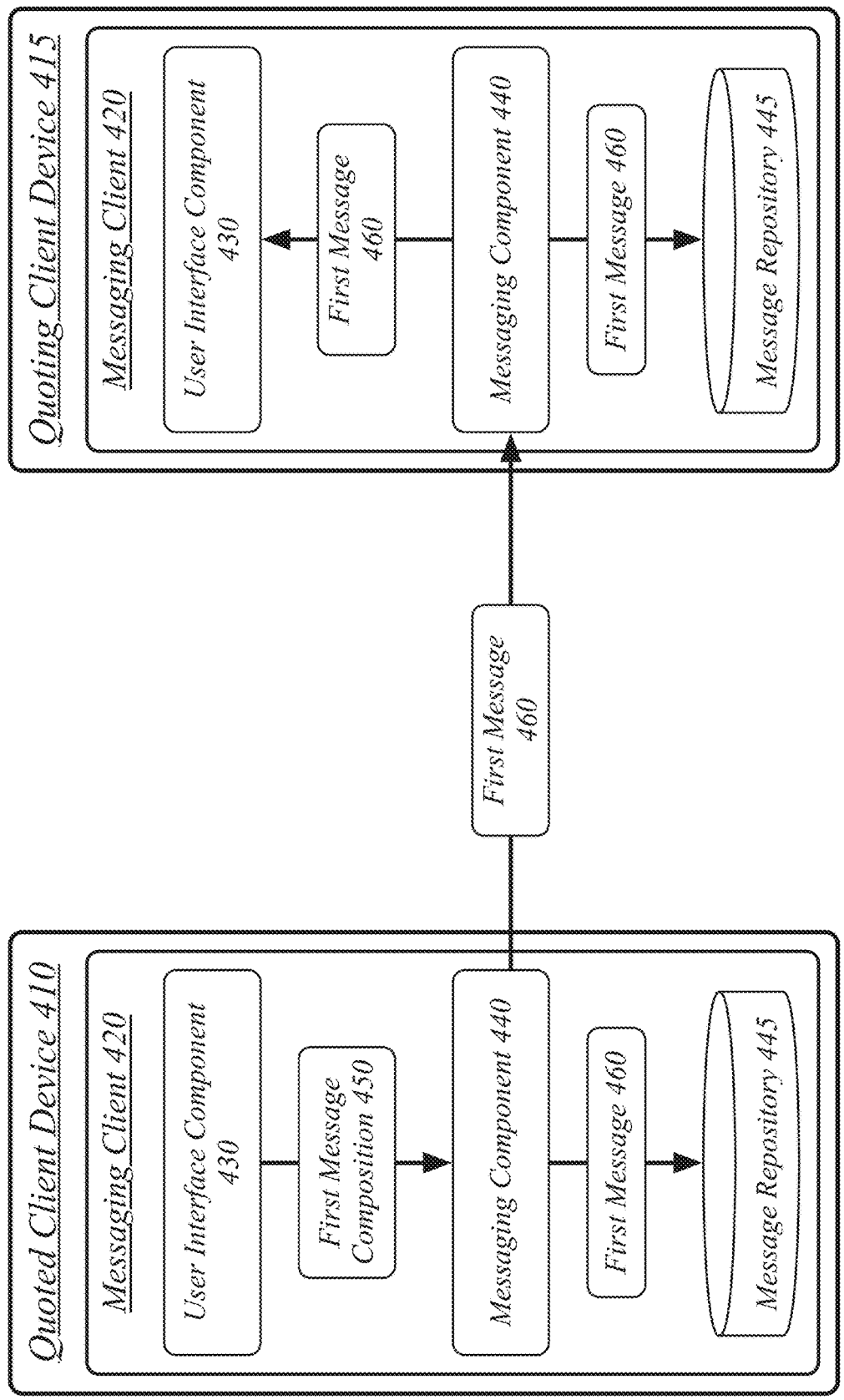
FIG. 4 illustrates an embodiment of a first message being sent from a quoted client device to a quoting client device.

FIG. 4 illustrates an embodiment of a first message being sent from a quoted client device 410 to a quoting client device 415.

The quoted client device 410 and quoting client device 415 may be two of a plurality of client devices communicating using a messaging system 110 and implementing the messaging flow visualization system 100. Each of the client devices 410, 415 executes a messaging client 420. The messaging client 420 on each device comprises a plurality of components. The plurality of components may comprise software components. The components of the messaging client 420 may include additional components to those described here and the operations of the messaging client 420 may be divided between components in different configurations in different embodiments.

The messaging client 420 may comprise a messaging component 440. The messaging component 440 may be generally arranged to perform the interactions between the messaging client 420 and the messaging system 110. The messaging component 440 may send network communication to and receive network communication from messaging servers of the messaging system 110.

The messaging client 420 may comprise a user interface component 430. The user interface component 430 may be generally arranged to present information to a user of a client device and receive user commands from the user of the client device. The user interface component 430 may display visual information, output audio information, and otherwise present information to a user. The user interface component 430 may receive touch commands, text commands, voice commands, and any other sort of command for the operation of the messaging client 420.

The user of the quoted client device 410 uses the user interface component 430 of the messaging client 420 to generate a first message composition 450. The first message composition 450 comprises text, media, and/or any other messaging content. The first message composition 450 is passed to the messaging component 440 and embodied in a first message 460. A first message 460 may be a message package conforming to a message packet format. The message package format may include a data section comprising the user-contributed contents of a message and a metadata section comprising additional information used in routing, displaying, and otherwise processing the message. This first message 460 is stored in a message repository 445 local to the quoted client device 410 and is also sent by the messaging component 440 to the quoting client device 415. The sending of the first message 460 to the quoting client device 415 may be mediated by the messaging servers of the messaging system 110.

The messaging component 440 of the messaging client 420 on the quoting client device 415 receives the first message 460. The first message 460 is stored in the message repository 445 local to the quoting client device 415 and is provided to the user interface component 430 for display to the user of the quoting client device 415. The user of the quoting client device 415 may then selected the first message 460 for quoting in a message composition by that user.

Figure 5:
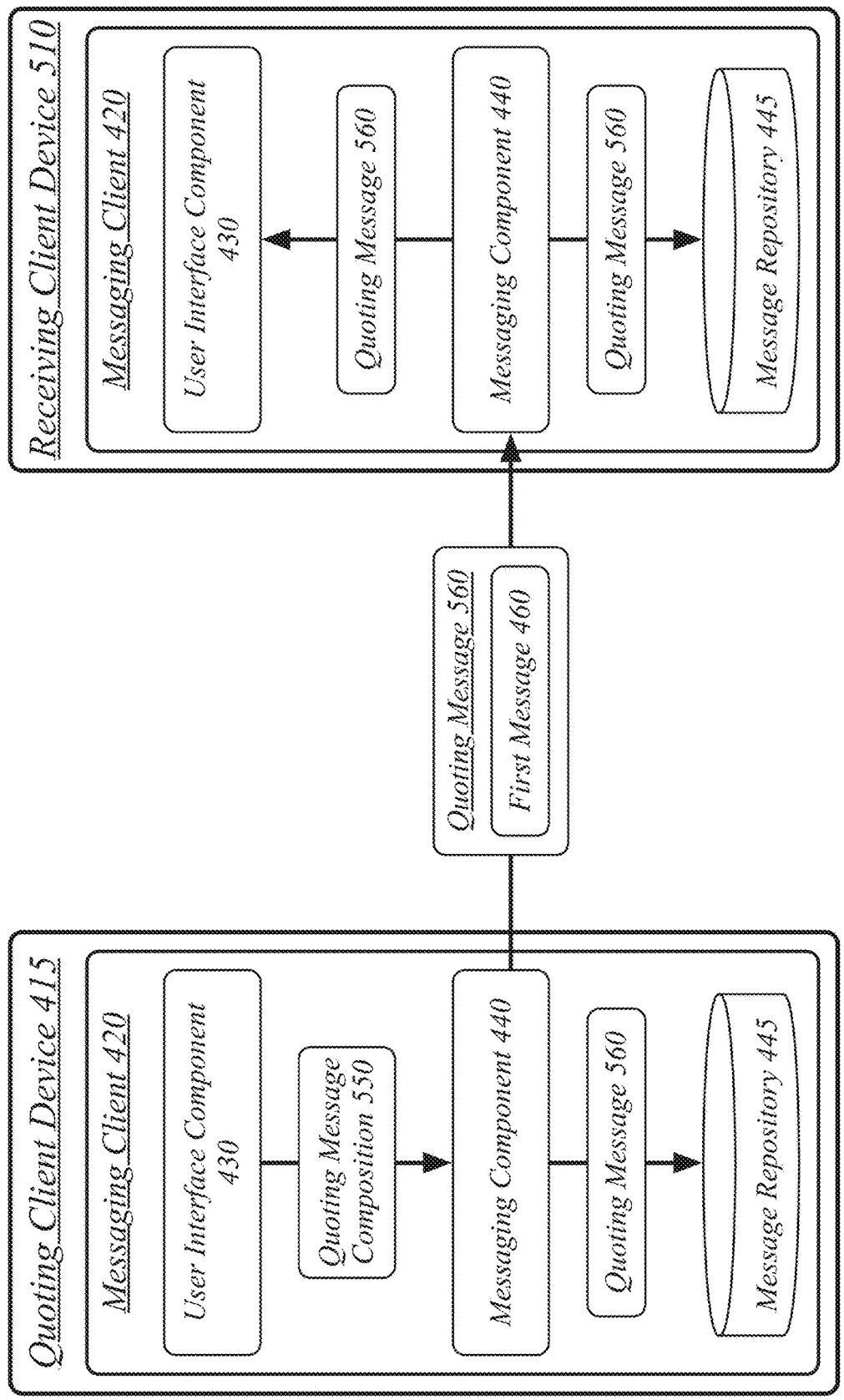
FIG. 5 illustrates an embodiment of a quoting messaging being sent from a quoting client device to a receiving client device.

FIG. 5 illustrates an embodiment of a quoting messaging being sent from a quoting client device 415 to a receiving client device 510.

In some cases, the receiving client device 510 may correspond to the quoted client device 410. In other cases, the receiving client device 510 may be a distinct client device from the quoted client device 410.

The user of the quoting client device 415 uses the user interface component 430 of the messaging client 420 to generate a quoting message composition 550. The quoting message composition 550 comprises text, media, and/or any other messaging content, as well as a quote of the first message 460. The quoting message composition 550 is passed to the messaging component 440 and embodied in a quoting message 560. The quoting message 560 encapsulates the first message 460 within it as a quote. This quoting message 560 is stored in a message repository 445 local to the quoting client device 415 and is also sent by the messaging component 440 to a receiving client device 510. The sending of the quoting message 560 to the receiving client device 510 may be mediated by the messaging servers of the messaging system 110.

The messaging component 440 of the messaging client 420 on the receiving client device 510 receiving the quoting message 560. The quoting message 560 is stored in the message repository 445 local to the receiving client device 510 and is provided to the user interface component 430 for display to the user of the receiving client device 510.

The receiving client device 510 receives the quoting message 560 as a message package. The message package comprises a primary message portion and a quoted message portion. The quoted message portion corresponds to a recursive encoding of a message package format for the message package and includes a quoted message identifier identifying the quoted message. The use of a recursive encoding of the message package format means that the first message 460 is represented according to the message package format as it was originally sent from the quoted client device 410 to the quoting client device 415. The message package format includes a plurality of fields, with one of these fields being a quoted message field. The representation of the first message 460 in the message package format is stored in this quoted message field. In some cases, the quoted message portion may exclude one or more fields of the message package format when being stored in the quoted message field. For example, in some embodiments, only a single level of quoting may be used, such that the contents, if any, of the quoted message field for the first message 460 are excluded when the first message 460 is quoted in the quoting message 560.

In some cases, the contents of the first message 460 may be modified when the first message 460 is quoted. For example, if the first message 460 comprises an image, an image thumbnail may be used instead of the original image when quoting the first message 460 so as to reduce the bandwidth used for sending the quoting message 560. As such, the quoted message portion of the quoting message 560 may comprise an image thumbnail corresponding to an original image previously associated with the quoted message.

In configuring the user interface for displaying the quoting message 560, the messaging component 440 determines whether a quoted message store corresponding to the quoted message identifier is present on the receiving client device 510. A quoted message store is a storage of the quoted message. A quoted message store corresponding to the quoted message identifier is present on the receive client device 510 where a retrieval of the quoted message can be performed on the receiving client device 510 based on client-specific storage for the receiving client device 510, such as from a message repository 445 local to the receiving client device 510.

When dealing with images or other media, in some embodiments the media may not be included explicitly within a message body, but may instead be referenced, such as through a uniform resource locator (URL), media identification number (a media id that can be used for retrieval from a media storage system), or other reference technique. In some cases, a quoted media item may already be present on a client device, such as where the message history for the client device includes a previous sharing of the media item in a message thread. As such, retrieving a quoted message from a message repository 445 may empower the retrieval of the quoted media from the message repository 445, thereby eliminating an additional download of the media item from a media server. As such, the messaging component 440 may retrieve a quoted media item based on the quoted message store where the quoted message store corresponding to the quoted message identifier is present on the receiving client device 510. Alternatively, the messaging component 440 may retrieve the quoted media item from a media server for a messaging system where the quoted message store corresponding to the quoted message identifier is not present on the receiving client device 510. As such, the use of a network transaction to download a media item may be selective based on whether the quoted message store corresponding to the quoted message identifier is present on the receiving client device 510.

The messaging component 440 retrieves a primary message from the primary message portion. This primary message corresponds to the additional content provided by the user of the quoting client device 415, such as may correspond to a reply to or comment on the quoted message. The messaging component 440 then uses the local quoted message store of the quoted message where available, and uses the store of the quoted message in the quoting message 560 otherwise. The messaging component 440 retrieves a quoted message based on the quoted message store where the quoted message store corresponding to the quoted message identifier is present on the receiving client device 510. The messaging component 440 retrieves the quoted message from the quoted message portion of the message package where the quoted message store corresponding to the quoted message identifier is not present on the receiving client device 510. The user interface component 430 then displays the primary message in association with the quoted message on the receiving client device 510.

The user interface component 430 may configure the display of the quoting message and its quoted message using different colors so as to aid in distinguishing between the quoting message and its quoted message. The primary message is associated with a first contact and the quoted message associated with a second contact. The user interface component 430 retrieves a first color that is associated with the first contact in a contact store and retrieves a second color that is associated with the second contact in the contact store. This contact store may be stored locally on the receiving client device 510. The contact store may be part of the local data store for the messaging client 420. The user interface component 430 then displays the primary message based on the first color, particularly one or more portions of the primary message that are distinct from the quoted message. For example, the user interface component 430 may display the primary message based on the first color by displaying a first contact name associated with the first contact in the first color. The user interface component 430 displays the quoted message based on the second color. The user interface component 430 may display the quoted message based on the second color by displaying a second contact name associated with the second contact in the second color. Alternatively or additionally, displaying the quoted message based on the second color may consist of displaying a vertical bar of the second color along a side portion of a quoted message display.

Figure 6:
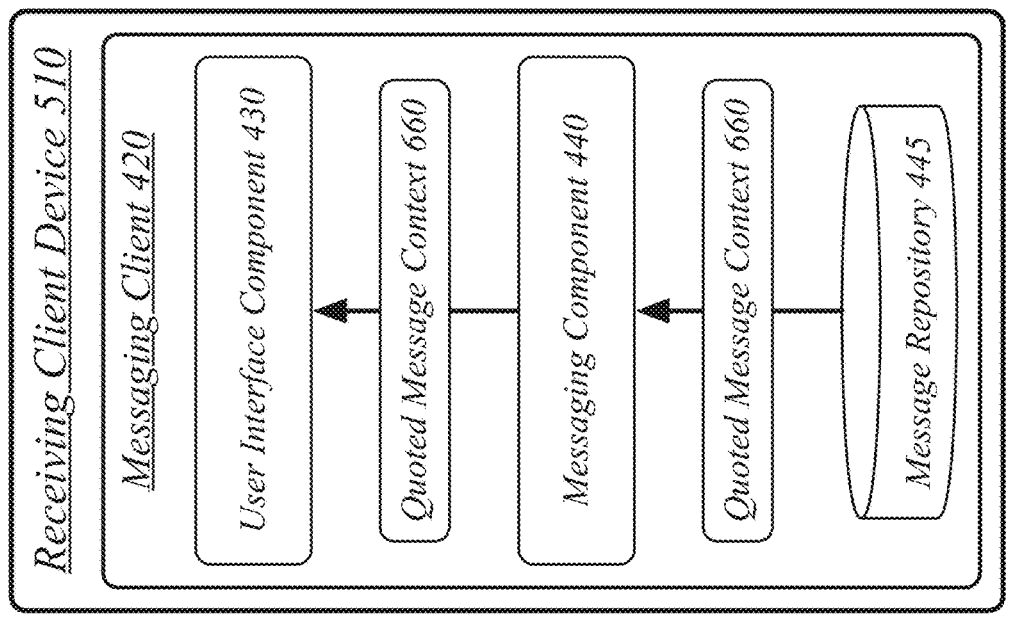
FIG. 6 illustrates an embodiment of a receiving client device retrieving quoted message context for a quoting message.

FIG. 6 illustrates an embodiment of a receiving client 510 device retrieving quoted message context 660 for a quoting message 560.

Making available the context of a quoted message may benefit a user in understanding a quoted message by providing messages that were displayed before and/or after the quoted message so as to play the quoted message in context. As such, the display of a quoted message within a quoting message may include one or more controls that empower the user to shift a display of a message thread to the context of the quoted message.

The user interface component 430 may receive a quoted message selection in association with a display of the quoted message in a message thread interface for a message thread. For instance, the screen area of the display of the quoted message may comprise a touch-screen control that, when touched, generates a quoted message selection instructing the user interface component 430 to display the context of the quoted message. The user interface component 430 then, in response to the quoted message selection, redirects the message thread interface to an initial display of the quoted message in the message thread.

However, the user interface component 430 only performs this redirection where the quoted message store corresponding to the quoted message identifier is present on the receiving client device 510, as otherwise the quoted message context 660 is not available for display. In some cases, the quoted message context 660 may be unavailable because the user was not a participant in the message thread when the quoted message was sent. Alternatively, the user may have been a participant in the message thread, but since then the user has transitioned client devices or otherwise lost the quoted message context 660. In another alternative, the quoted message context 660 may be unavailable because the context was deleted. Where the quoted message context 660 is present, the user interface component 430 retrieves it from the message repository 445, as may be performed via the messaging component 440. Where the quoted message context 660 is not present on the receiving client device 510, the user interface component 430 may deactivate or refrain from making available the user interface control for retrieving the quoted message context 660. In order to empower this retrieval, the quoted message identifier identifying the quoted message is assigned to be a message identifier for the initial display of the quoted message.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a message package at a client device, the message package comprising a primary message portion and a quoted message portion, the quoted message portion comprising a quoted message identifier at block 702.

The logic flow 700 may determine whether a quoted message store corresponding to the quoted message identifier is present on the client device at block 704.

The logic flow 700 may retrieve a primary message from the primary message portion at block 706.

The logic flow 700 may retrieve a quoted message based on the quoted message store where the quoted message store corresponding to the quoted message identifier is present on the client device at block 708.

The logic flow 700 may retrieve the quoted message from the quoted message portion of the message package where the quoted message store corresponding to the quoted message identifier is not present on the client device at block 710.

The logic flow 700 may display the primary message in association with the quoted message on the client device at block 712.

The embodiments are not limited to this example.

Figure 8:
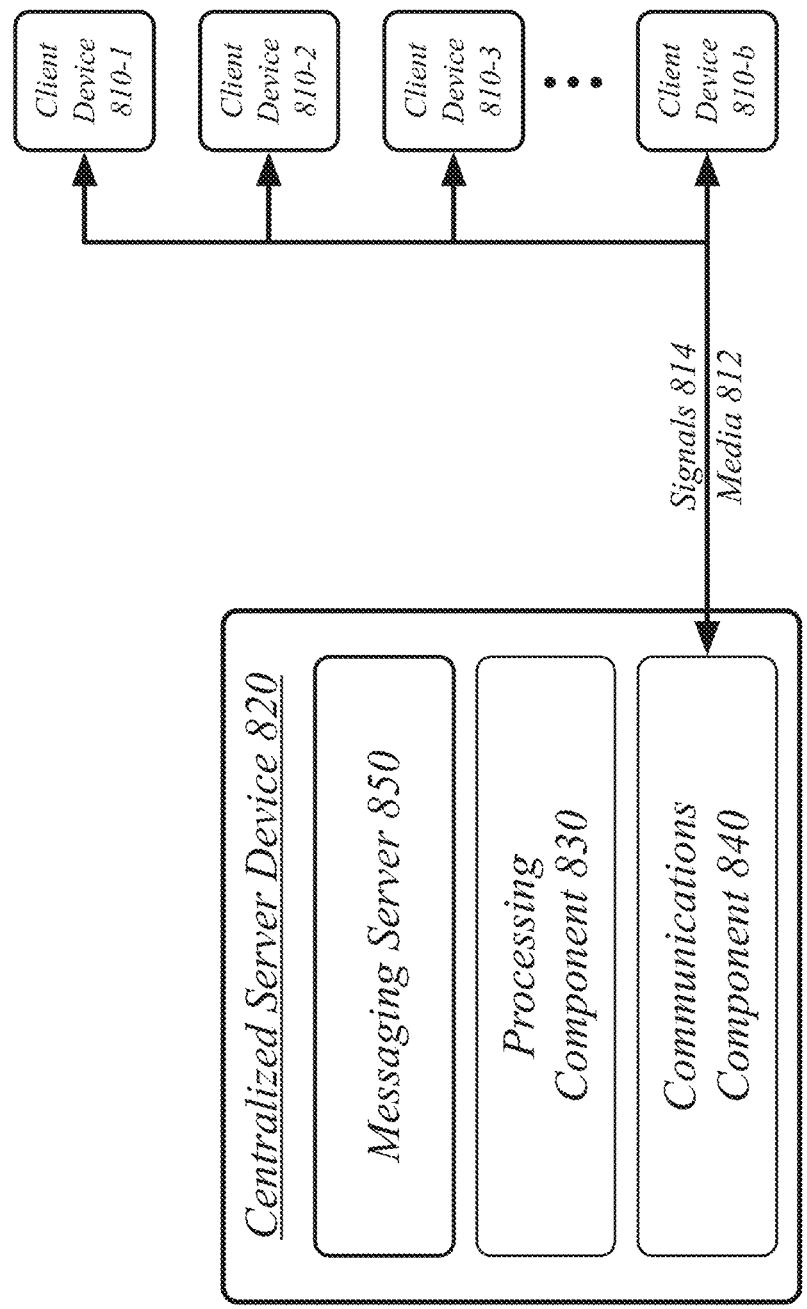
FIG. 8 illustrates an embodiment of a centralized system for the system of FIG. 1.

FIG. 8 illustrates a block diagram of a centralized system 800. The centralized system 800 may implement some or all of the structure and/or operations for the messaging flow visualization system 100 in a single computing entity, such as entirely within a single centralized server device 820.

The centralized server device 820 may comprise any electronic device capable of receiving, processing, and sending information for the messaging flow visualization system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 820 may execute processing operations or logic for the messaging flow visualization system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 820 may execute communications operations or logic for the messaging flow visualization system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 820 may communicate with other devices over a communications media 812 using communications signals 814 via the communications component 840. The devices may be internal or external to the centralized server device 820 as desired for a given implementation.

The centralized server device 820 may execute a messaging server 850. The messaging server 850 may comprise a messaging server for a messaging system 110. The messaging server 850 may provide messaging operations for a plurality of client devices 810, receiving and sending messages between the client devices 810. The client devices 810 may correspond to one or more of a smartphone device 150, tablet device 160, personal computer device 180, and/or any of the client device 320, quoted client device 410, quoting client device, and receiving client device 510.

Figure 9:
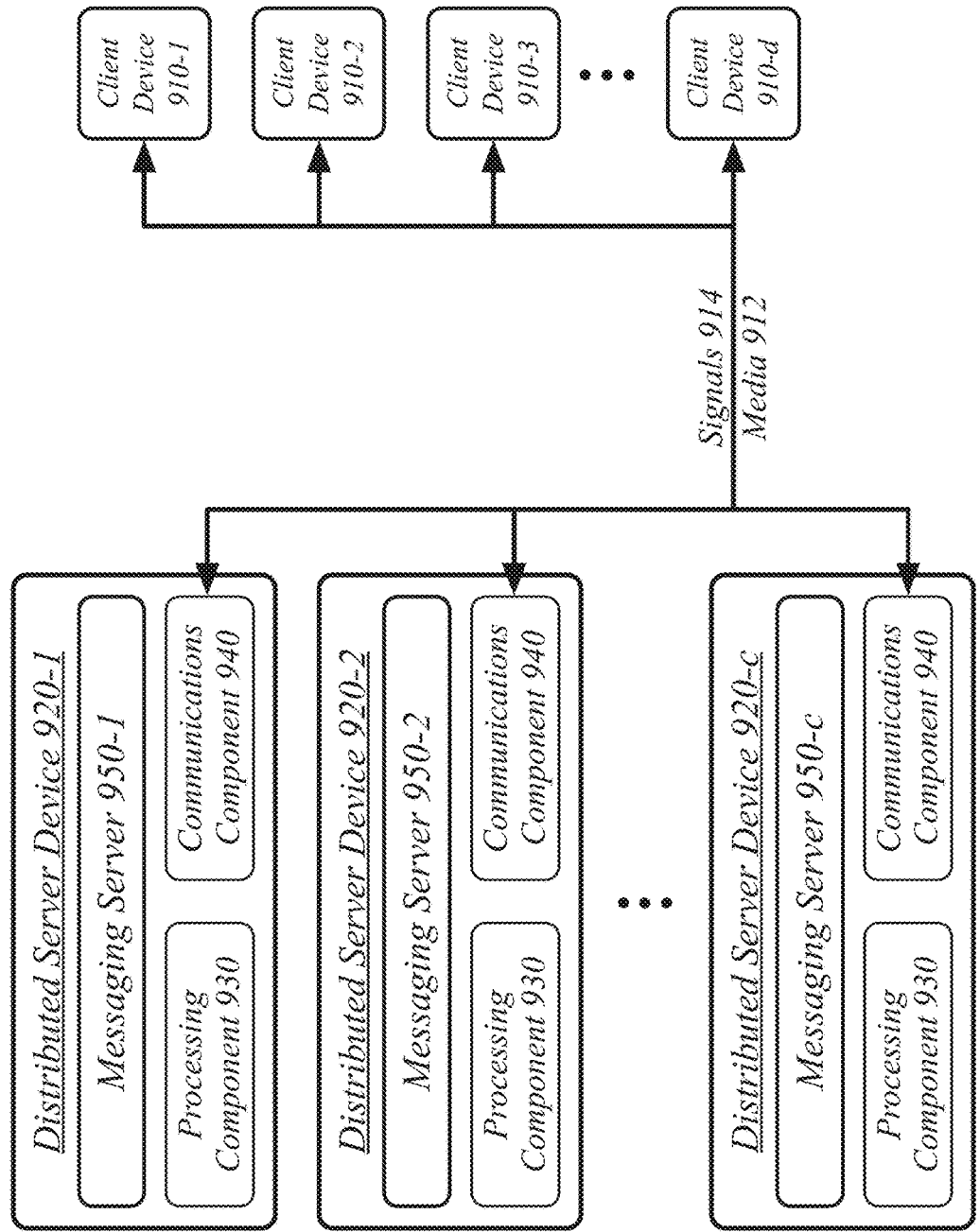
FIG. 9 illustrates an embodiment of a distributed system for the system of FIG. 1.

FIG. 9 illustrates a block diagram of a distributed system 900. The distributed system 900 may distribute portions of the structure and/or operations for the messaging flow visualization system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of distributed server devices 920. In general, the distributed server devices 920 may be the same or similar to the centralized server device 820 as described with reference to FIG. 8. For instance, the distributed server devices 920 may each comprise a processing component 930 and a communications component 940 which are the same or similar to the processing component 830 and the communications component 840, respectively, as described with reference to FIG. 8. In another example, the distributed server devices 920 may communicate over a communications media 912 using communications signals 914 via the communications components 940.

The distributed server devices 920 may comprise or employ one or more server programs that operate to perform various methodologies in accordance with the described embodiments. In one embodiment, for example, the distributed server devices 920 may each execute one of a plurality of messaging servers 950. The messaging servers 950 may comprise messaging servers for a messaging system 110. The messaging servers 950 may provide messaging operations for a plurality of client devices 910, receiving and sending messages between the client devices 910. The client devices 910 may correspond to one or more of a smartphone device 150, tablet device 160, personal computer device 180, and/or any of the client device 320, quoted client device 410, quoting client device, receiving client device 510, and client devices 810.

Figure 10:
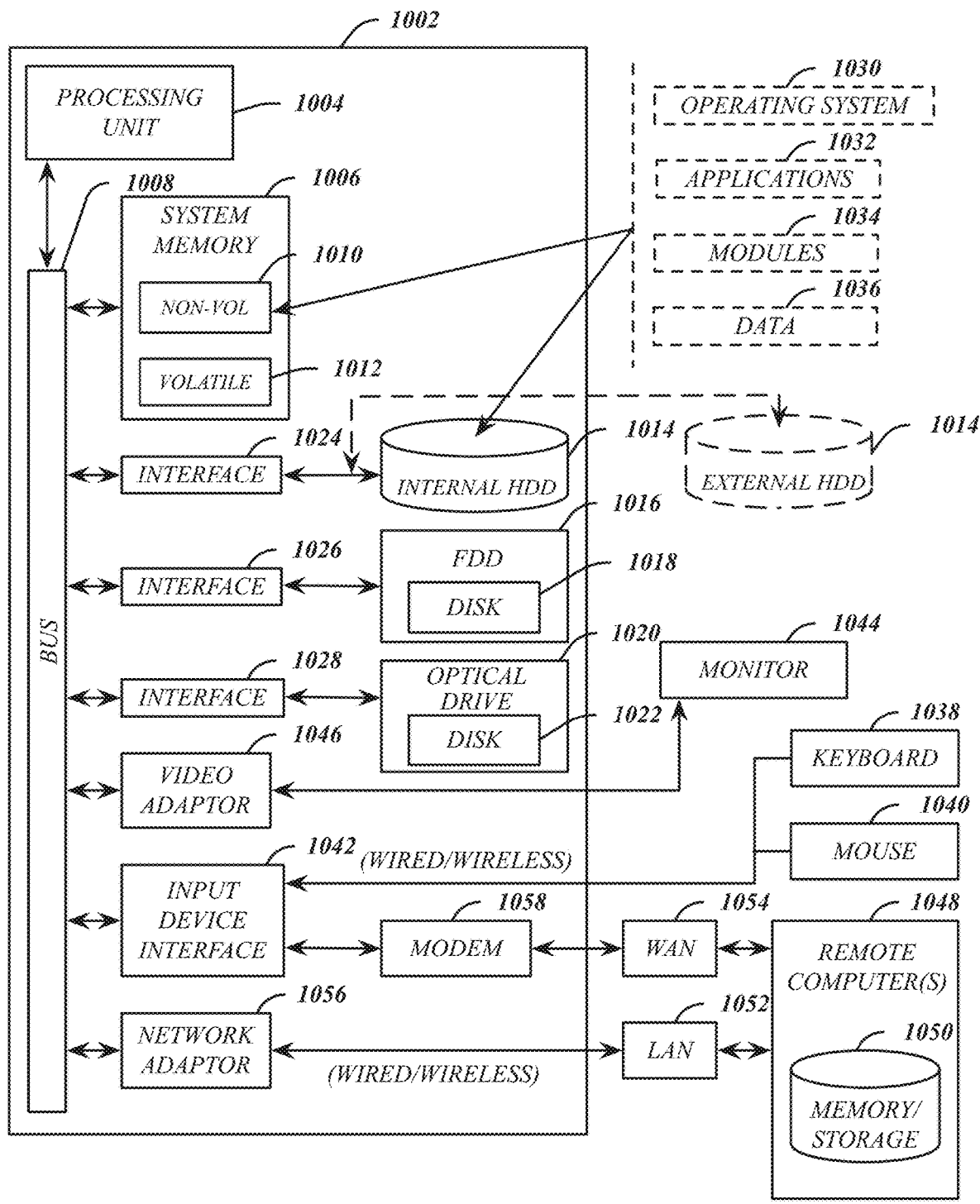
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the messaging flow visualization system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
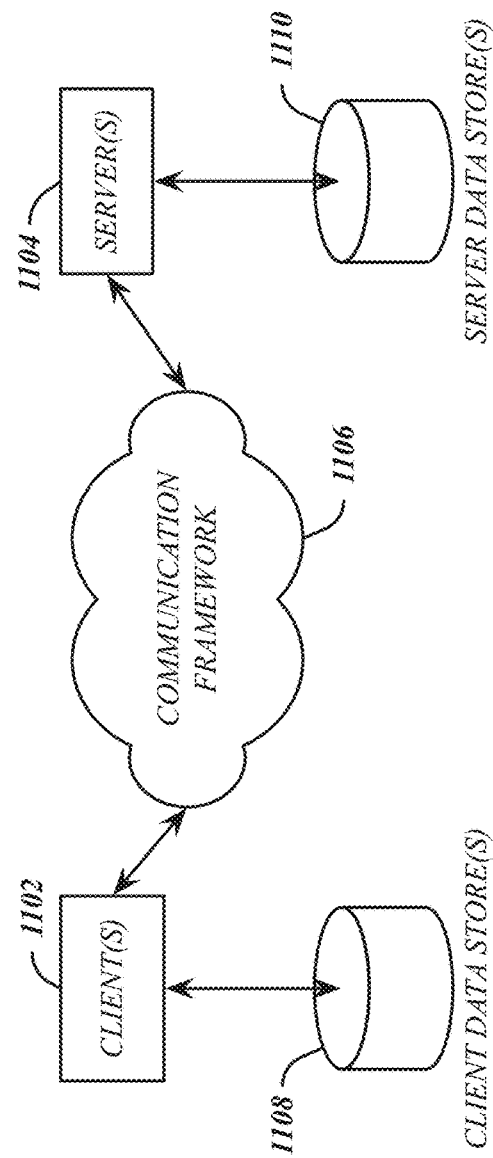
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may comprise messaging clients executing on client devices, such as one or more of a smartphone device 150, tablet device 160, personal computer device 180, and/or any of the client device 320, quoted client device 410, quoting client device, receiving client device 510, client devices 810, and client devices 910. The servers 1104 may comprise messaging servers, such as messaging server 850 or messaging servers 950. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
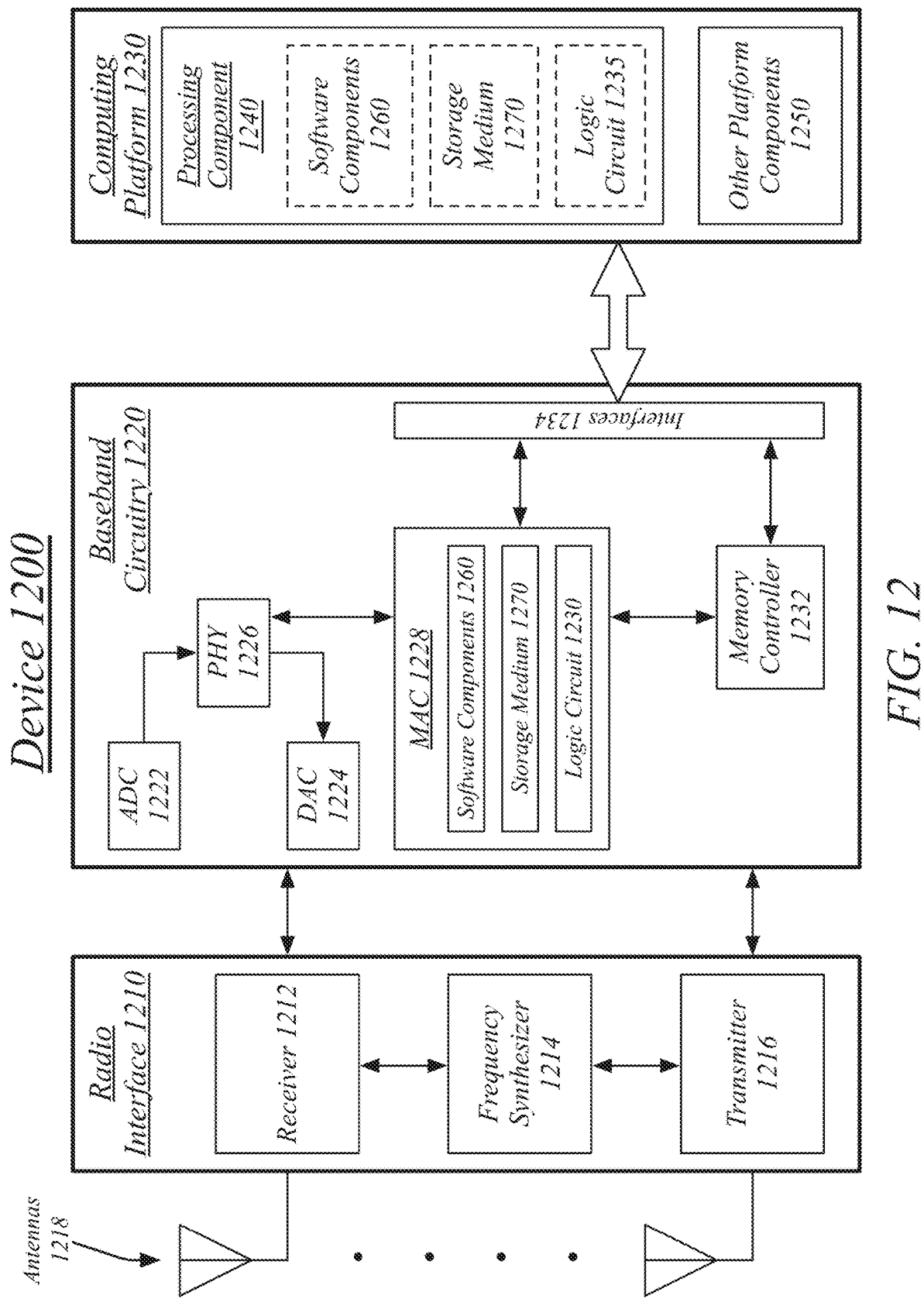
FIG. 12 illustrates an embodiment of a radio device architecture.

FIG. 12 illustrates an embodiment of a device 1200 for use in a multicarrier OFDM system, such as the messaging flow visualization system 100. Device 1200 may implement, for example, software components 1260 as described with reference to messaging flow visualization system 100 and/or a logic circuit 1235. The logic circuit 1235 may include physical circuits to perform operations described for the messaging flow visualization system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the messaging flow visualization system 100 and/or logic circuit 1235 in a single computing entity, such as entirely within a single device. Alternatively, the device 1200 may distribute portions of the structure and/or operations for the messaging flow visualization system 100 and/or logic circuit 1235 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the messaging flow visualization system 100 and logic circuit 1235 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a message package at a client device, the message package comprising a primary message portion and a quoted message portion, the quoted message portion comprising a quoted message identifier; determining whether a quoted message store corresponding to the quoted message identifier is present on the client device; retrieving a primary message from the primary message portion; retrieving a quoted message based on the quoted message store where the quoted message store corresponding to the quoted message identifier is present on the client device; retrieving the quoted message from the quoted message portion of the message package where the quoted message store corresponding to the quoted message identifier is not present on the client device; and displaying the primary message in association with the quoted message on the client device.

A computer-implemented method may further comprise receiving a quoted message selection in association with a display of the quoted message in a message thread interface for a message thread; and redirecting the message thread interface to an initial display of the quoted message in the message thread where the quoted message store corresponding to the quoted message identifier is present on the client device.

A computer-implemented method may further comprise the quoted message identifier corresponding to a message identifier for the initial display of the quoted message.

A computer-implemented method may further comprise the primary message associated with a first contact, the quoted message associated with a second contact, further comprising: retrieving a first color associated with the first contact in a contact store; retrieving a second color associated with the second contact in the contact store; displaying the primary message based on the first color; displaying the quoted message based on the second color.

A computer-implemented method may further comprise the contact store stored locally on the client device.

A computer-implemented method may further comprise wherein displaying the primary message based on the first color comprises displaying a first contact name associated with the first contact in the first color, wherein displaying the quoted message based on the second color comprises displaying a second contact name associated with the second contact in the second color.

A computer-implemented method may further comprise wherein displaying the quoted message based on the second color comprises displaying a vertical bar of the second color along a side portion of a quoted message display.

A computer-implemented method may further comprise the quoted message portion corresponding to a recursive encoding of a message package format for the message package.

A computer-implemented method may further comprise the quoted message portion excluding one or more fields of the message package format.

A computer-implemented method may further comprise the quoted message portion comprising an image thumbnail corresponding to an original image previously associated with the quoted message.

An apparatus may comprise a processor circuit on a device; a messaging component operative on the processor circuit to receive a message package at a client device, the message package comprising a primary message portion and a quoted message portion, the quoted message portion comprising a quoted message identifier; determine whether a quoted message store corresponding to the quoted message identifier is present on the client device; retrieve a primary message from the primary message portion; retrieve a quoted message based on the quoted message store where the quoted message store corresponding to the quoted message identifier is present on the client device; and retrieve the quoted message from the quoted message portion of the message package where the quoted message store corresponding to the quoted message identifier is not present on the client device; and a user interface component operative on the processor circuit to display the primary message in association with the quoted message on the client device. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving, at a client device, a message package comprising a primary message and a quoted message portion, the quoted message portion comprising a quoted message identifier for a quoted message and a recursive encoding of a message package format, the quoted message previously sent to a plurality of accounts participating in a group message thread, the message package format including the quoted message and metadata for displaying the quoted message, wherein a first account associated with the client device was not one of the plurality of accounts participating in the group message thread when the quoted message was sent to the group message thread, wherein the first account joined the group message thread subsequent to the sending of the quoted message to the group message thread;
   determining whether a quoted message store corresponding to the quoted message identifier is on the client device;
   if the quoted message store is not on the client device:
      retrieving the quoted message from the quoted message portion of the message package; and
      displaying the primary message with the quoted message in a message thread interface for the group message thread based on the message package format, wherein the quoted message store is not on the client device based on the first account joining the group message thread subsequent to the sending of the quoted message to the group message thread; and
   if the quoted message store is on the client device:
      retrieving the quoted message from the quoted message store;
      displaying the primary message portion with the quoted message portion in the message thread interface for the group message thread based on the message package format;
      receiving a quoted message selection of the quoted message; and
      based on the selection, scrolling the message thread interface to an initial display of the quoted message.

2. The method of claim 1, the quoted message identifier corresponding to a message identifier for the initial display of the quoted message, wherein scrolling the message thread interface to the initial display of the quoted message does not display the primary message.

3. The method of claim 1, the primary message associated with a first contact, the quoted message associated with a second contact, further comprising:
   retrieving a first color associated with the first contact in a contact store;
   retrieving a second color associated with the second contact in the contact store;
   displaying the primary message based on the first color; and
   displaying the quoted message based on the second color.

4. The method of claim 3, wherein displaying the primary message based on the first color comprises displaying a first contact name associated with the first contact in the first color, wherein displaying the quoted message based on the second color comprises displaying a second contact name associated with the second contact in the second color.

5. The method of claim 3, wherein displaying the quoted message based on the second color comprises displaying a vertical bar of the second color along a side portion of a quoted message display.

6. The method of claim 1, the quoted message portion comprising an image thumbnail corresponding to an original image associated with the quoted message, wherein the image thumbnail is received from a media server based on a uniform resource locator (URL) for the image thumbnail specified in the message package.

7. The method of claim 1, wherein the message package is received subsequent to the sending of the quoted message to the group message thread, and wherein the message package is received subsequent to the first account joining the group message thread.

8. The method of claim 1, wherein the quoted message store is on the client device based on a first account associated with the client device being one of the plurality of accounts participating in the group message thread when the quoted message was sent to the group message thread.

9. An apparatus, comprising:
   a processor circuit on a device;
   a messaging component operative on the processor circuit to:
      receive a message package comprising a primary message and a quoted message portion, the quoted message portion comprising a quoted message identifier for a quoted message and a recursive encoding of a message package format, the quoted message previously sent to a plurality of accounts participating in a group message thread, and the message package format including the quoted message and metadata for displaying the quoted message, wherein a first account associated with the device was not one of the plurality of accounts participating in the group message thread when the quoted message was sent to the group message thread, wherein the first account joined the group message thread subsequent to the sending of the quoted message to the group message thread;
      determine whether a quoted message store corresponding to the quoted message identifier is on the device; and
      if the quoted message store is not on the device, retrieve the quoted message from the quoted message portion of the message package, wherein the quoted message store is not on the device based on the first account joining the group message thread subsequent to the sending of the quoted message to the group message thread; and
   a user interface component operative on the processor circuit to
      display the primary message with the quoted message in a message thread interface for the group message thread based on the message package format;
      receive a quoted message selection of the quoted message; and
      based on receiving the selection, scrolling the message thread interface for the group message thread to an initial display of the quoted message.

10. The apparatus of claim 9, the primary message associated with a first contact, the quoted message associated with a second contact, further comprising:

the user interface component operative to retrieve a first color associated with the first contact in a contact store;
retrieve a second color associated with the second contact in the contact store;
display the primary message based on the first color; and
display the quoted message based on the second color.

11. The apparatus of claim 10, wherein displaying the primary message based on the first color comprises displaying a first contact name associated with the first contact in the first color, wherein displaying the quoted message based on the second color comprises displaying a second contact name associated with the second contact in the second color.

12. The apparatus of claim 10, wherein displaying the quoted message based on the second color comprises displaying a vertical bar of the second color along a side portion of a quoted message display.

13. At least one non-transitory computer-readable storage medium comprising instructions that, when executed, cause a system to:
receive, at a client device, a message package comprising a primary message portion and a quoted message portion, the quoted message portion comprising a quoted message identifier for a quoted message and a recursive encoding of a message package format, the quoted message previously sent to a plurality of accounts participating in a group message thread, and the message package format including the quoted message and metadata for displaying the quoted message, wherein a first account associated with the client device was not one of the plurality of accounts participating in the group message thread when the quoted message was sent to the group message thread, wherein the first account joined the group message thread subsequent to the sending of the quoted message to the group message thread;
determine whether a quoted message store corresponding to the quoted message identifier is on the client device; and
if the quoted message store is not on the client device:
retrieve the quoted message from the quoted message portion of the message package, wherein the quoted message store is not on the client device based on the first account joining the group message thread subsequent to the sending of the quoted message to the group message thread; and
display the primary message with the quoted message in a message thread interface for the group message thread based on the message package format;
receive a quoted message selection of the quoted message; and
based on receiving the selection, scroll the message thread interface for the group message thread to an initial display of the quoted message, the quoted message identifier corresponding to a message identifier for the initial display of the quoted message.

14. The non-transitory computer-readable storage medium of claim 13, the primary message associated with a first contact, the quoted message associated with a second contact, comprising further instructions that, when executed, cause a system to:
retrieve a first color associated with the first contact in a contact store;
retrieve a second color associated with the second contact in the contact store;
display the primary message based on the first color; and
display
the quoted message based on the second color.

15. The non-transitory computer-readable storage medium of claim 14, wherein displaying the primary message based on the first color comprises displaying a first contact name associated with the first contact in the first color, wherein displaying the quoted message based on the second color comprises displaying a second contact name associated with the second contact in the second color.

16. The non-transitory computer-readable storage medium of claim 15, wherein displaying the quoted message based on the second color further comprises displaying a vertical bar of the second color along a side portion of a quoted message display.

* * * * *